US 12,450,360 B2

(12) United States Patent
Jabara et al.

(10) Patent No.: US 12,450,360 B2
(45) Date of Patent: Oct. 21, 2025

(54) SELF-ATTESTATION SECURITY VERIFICATION AND REPORTING SYSTEM

(71) Applicant: IOXT, LLC, Costa Mesa, CA (US)

(72) Inventors: Gary B. Jabara, Newport Beach, CA (US); Lloyd Linder, Agoura Hills, CA (US); Craig Miller, San Clemente, CA (US)

(73) Assignee: IOXT, LLC, Costa Mesa, CA (US)

( * ) Notice: Subject to any disclaimer, the term of this patent is extended or adjusted under 35 U.S.C. 154(b) by 385 days.

(21) Appl. No.: 18/131,536

(22) Filed: Apr. 6, 2023

(65) Prior Publication Data

US 2024/0338453 A1 Oct. 10, 2024

(51) Int. Cl.
G06F 21/57 (2013.01)
G06Q 30/018 (2023.01)

(52) U.S. Cl.
CPC ......... G06F 21/577 (2013.01); G06Q 30/018 (2013.01); G06F 2221/033 (2013.01)

(58) Field of Classification Search
None
See application file for complete search history.

(56) References Cited

U.S. PATENT DOCUMENTS

| 2006/0174335 | A1* | 8/2006 | Jorgenson | H04L 63/0263 726/10 |
| 2011/0093403 | A1* | 4/2011 | Waldo | G06F 40/226 235/375 |
| 2014/0324519 | A1* | 10/2014 | Dennis | G06Q 10/0635 705/7.28 |
| 2020/0374700 | A1* | 11/2020 | Smith | H04L 9/3268 |
| 2022/0414230 | A1* | 12/2022 | Gitelman | G06F 21/572 |

\* cited by examiner

*Primary Examiner* — Paul R Fisher
(74) *Attorney, Agent, or Firm* — Davis Wright Tremaine LLP; Heather M. Colburn

(57) ABSTRACT

A method self-attestation security verification and reporting for a product by a company is disclosed. The method uses a processor for: (a) receiving a request for selected certification type; (b) dynamically creating a self-certification entry form based on elements of the selected certification type; (c) saving responses entered into the form; (d) automatically validating the responses according to a test plan invoked by the selected certification type; (e) upon successful validation, including the product in a public list of certified products; (f) automatically reviewing the successful validation of the product after a predetermined time period; (g) if the product fails the automatic validation, sending a message to the company regarding the basis for failed certification; and (h) if the product fails the automatic update, sending a message to the company regarding the basis for pending denial of certification, wherein the messages contain a hyperlink to the responses for the product.

14 Claims, 10 Drawing Sheets

FIG. 5

Vulnerability reporting program

VDP in place — N/A

Accept External Submissions — N/A

Monitoring Security Relevant Components — N/A

Responsible Disclosures of defects to impacted parties that must take action — N/A Public Researcher Rewards Program — N/A

FIG. 6 www.public-certification-source.org

Public Certification List

| Type | Category | Certification Type | Ecosystem | Company or Product Name |

Prod A1
Certified
A Brnd Room Controller
A-Brand
Certification Method: Manufacturer Certified
Ecosystems: Network Lighting Controls

Prod M7
Certified
Bar Code Reader
M-Brand
Certification Method: Manufacturer Certified
Ecosystems: Android

Prod R23
Certified
VPN
R-Brand
Certification Method: Authorized Labs - Black box certified
Ecosystems: Android

Prod X15
Certified
Light Controller
X-Brand
Certification Method: Manufacturer Certified
Ecosystems: Network Lighting Controls 1 2 3 4 5 >

FIG. 9

SELF-ATTESTATION SECURITY VERIFICATION AND REPORTING SYSTEM

The present invention relates to a security identification system that searches and identifies threats either known or not yet known to the market and compares those threats with known or extrapolated technical information about a product where the product may include hardware, firmware, software, drivers, and libraries, to match a threat in relation to a product. Furthermore, the security identification system includes a threat rating module smartly configured and enabled to apply a threat rating identifier for the product and communicate the rating to manufactures of similar products.

BACKGROUND AND SUMMARY

To expedite time to market and to increase product reliability electronic manufactures and software developers often use known hardware and/or software solutions previously used or developed by a third party. This has become so prevalent that an open source community (opensource.org) has been created to assist in the sharing of software stacks which includes drivers, libraries, etc. Additionally, when hardware manufactures require and implement a standard protocol to communicate with additional hardware or software components, they often incorporate a known third-party solution. An example of this is when an electronic lightbulb manufacturer develops a lightbulb enabled to communicate on a network the electronic lightbulb manufacturer will need to incorporate a known communication solution such as a WIFI chipset (Intel Corporation's WAV500 chip) with standard communication protocols enable the lightbulb to communicate on a local area network. Furthermore, there may be an open source software library available which enables the WIFI chip to connect to non-private hotspots. Acquiring the open source library and WIFI chipset enables the lightbulb manufacture to produce an electronic lightbulb with communication capabilities without having to develop the communication chip and libraries, thereby shortening the development of the electronic lightbulb and time to market.

To ensure consumer safety, electronic product manufacturers must provide electronic product that meet explicit standards and continually provide updates to ensure protection against threats that exploit vulnerabilities within their products. These threats are generally detected and published by government sponsored vulnerability listing organization established to ensure that electronic products that are made available to the public, are safe. One such vulnerability listing organization, National Institute of Standards and Technology (NIST) is run by the United States Department of Commerce and manages a searchable vulnerability database which includes threats and known vulnerabilities.

To streamline the process of ensuring the production of safe products, standards organizations have developed a set of standards that a product must meet to be defined safe from vulnerabilities as the product enters the market. Electronic product manufactures utilize third party testing labs that test the electronic product to ensure compliance to a specific standard. In the process, electronic product manufactures provide technical details relating to their product which includes a hardware and software build of materials (BOM) list. If a testing lab has found, through testing that an electronic product manufacture's electronic product has met the specific standard the electronic product manufacture is provided with a certification by the standard association confirming compliance to that specific standard. Although this helps identify that a specific product is safe from vulnerabilities only the electronic manufacture, the test lab and possibly the standards organization have the information thereby creating a silo effect of information relating to that single product.

The present invention provides a rating module that enables a risk and threat identification system and identifies the likelihood of a specific threat or vulnerability relating to a product even if the products are not related nor reside in related markets thereby relieving the silo effect.

Additional features and advantages of the invention will become apparent to those skilled in the art upon consideration of the following detailed description of the illustrated embodiment exemplifying the modes of carrying out the invention as presently perceived.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component or process may be labeled in every drawing.

FIG. 5 is an illustration of another data entry screen of the graphical user interface of the self-certification portal 130 in accordance with an embodiment of the present invention.

FIG. 6 is an illustration of another screen of the graphical user interface of the self-certification portal 130 in accordance with an embodiment of the present invention.

FIG. 9 is an illustration of one data entry screen of the graphical user interface of the public certification list 140 in accordance with an embodiment of the present invention.

DETAILED DESCRIPTION OF THE DRAWINGS

Figure 1:
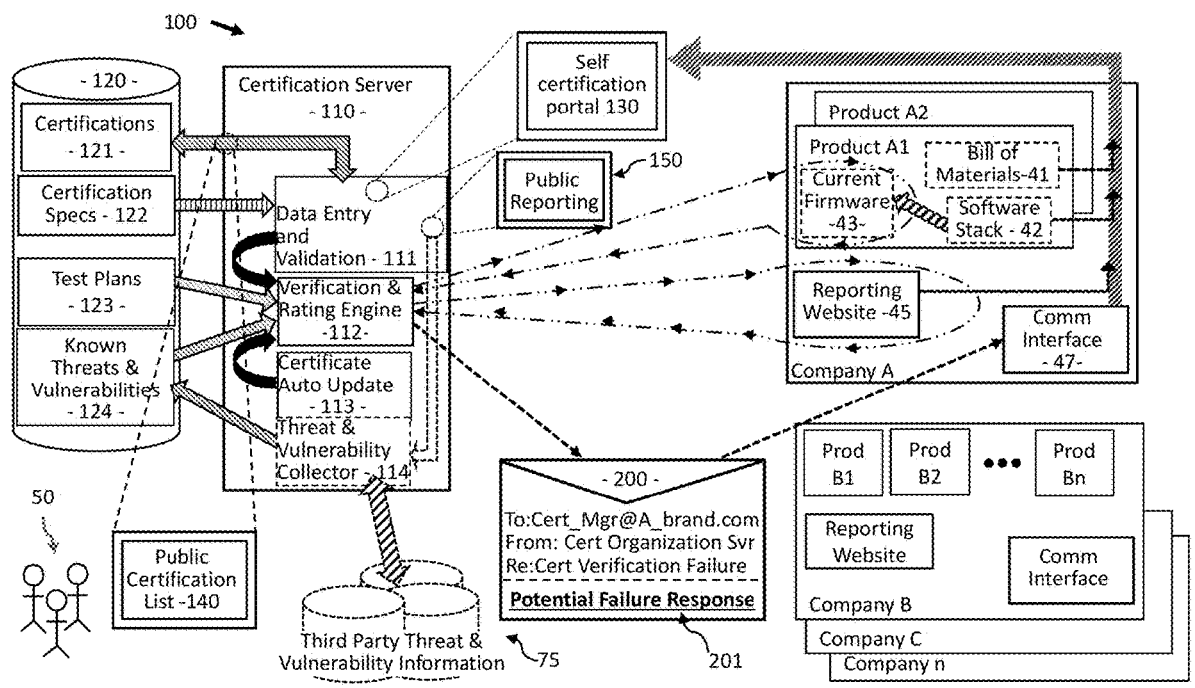
FIG. 1 is an illustration of high-level components of the self-attestation security verification and reporting system in accordance with an embodiment of the present invention.

The following detailed description is merely exemplary in nature and is not intended to limit the invention or the application and uses of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. The following detailed description is, therefore, not to be taken in a limiting sense. Furthermore, there is no intention to be bound by any expressed or implied theory presented in the preceding technical field, background, summary or the following detailed description.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, certain well-known features may not be described in detail to avoid unnecessarily complicating the instant disclosure.

A portion of the invention may be described herein in terms of steps. It should be appreciated that such steps may be realized by alternative order.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

As used herein, "components" or "modules" may be analog or digital components that perform one or more functions. The term "component" may include hardware, such as a processor (e.g., microprocessor), an application specific integrated circuit (ASIC), a field programmable gate array (FPGA), a combination of hardware and software, and/or the like. The term "processor" or "micro-processor" as used herein means a single processor or multiple processors/micro-processors working independently or together to collectively perform a task.

Software, application, or computer application may include one or more computer executable instructions that when executed by one or more components cause the component to perform a specified function. It should be understood that any and all algorithms described herein may be stored on one or more non-transitory memory. Exemplary non-transitory memory may include random access memory, read only memory, flash memory, and/or the like. Such non-transitory memory may be electrically based, optically based, and/or the like.

FIG. 1 is an illustration of high-level components of the self-attestation security verification and reporting system in accordance with an embodiment of the present invention. In particular, system 100 comprises a certification server 110, database 120, self-certification portal 130, public certification list 140, and public reporting portal 150. As illustrated, system 100 interacts with various third parties, such as manufacturers/suppliers (e.g., Company A, Company B, Company C, Company n), third party sources of threat and vulnerability information 75 and the public 50 to improve the security of various types of products particularly from hackers.

In particular, FIG. 1 illustrates that Company A may have products (e.g. Product A1 and Product A2) for which that company desires certification under one or more internet security standards (hereinafter certification specifications (or certification specs) 122). FIG. 1 similarly illustrates that Company B would have products in need of certification, as would Company C and Company n. These products may be any type of device, mobile application, or components thereof that may be accessed over a wide-area network (WAN), such as the internet, or over a local-area network (LAN) including but not limited to home appliances (e.g., air conditioners; coffee makers; cooking ranges; dehumidifiers; dishwashers; ovens/ranges; refrigerators; washing machines); automotive (e.g., telematics; vehicle mounted computers); finance/payment software; home & office equipment (e.g., bar code scanners; cameras (indoor/outdoor); mobile computers; tablet computers; outdoor lighting, video doorbells); IoT (internet of things) controllers; lighting & electrical (e.g., smart light bulbs; fixture controllers; room controllers); multimedia (e.g. home entertainment equipment; set-top boxes; smart phones; streaming boxes); security systems; sensors & controls (e.g. automatic sprinkler systems; energy usage managers; hot water heaters; HVAC controllers; thermostats); smart home controllers; social; telecom; VPN; wearables & health (e.g., internet-connected fitness equipment); and Wi-Fi & Networking (e.g. internet gateways; modems; routers, Wi-Fi modules).

FIG. 1 further illustrates that Product A1 may have a bill of materials ("BOM") 41, a software stack 42, and current firmware 43 (which should be compilation of software stack 42). As illustrated in FIG. 1, Company A also has a reporting website 45 (i.e. a website on which the public/end users may report actual/potential vulnerabilities with the company's products). FIG. 1 also illustrates that Company A has a communication interface 47, which may comprise an internet browser, email or other messaging client that allows workers at Company A to receive electronic communications from outside the company. The internet browser and email/other messaging client need not be part of the same software package and need not even be deployed on the same computer hardware.

As illustrated in FIG. 1, certification server 110 may be logically viewed as containing four processes: data entry and validation engine 111, verification & rating engine 112, certificate auto update engine 113, and threat & vulnerability collector engine 114. Each of these engines may be implemented as a collection of instructions (i.e., software) executed by one or more processors in association with other computer hardware (e.g., memory, communications interfaces, input/output systems, and one or more computer buses (e.g., address bus, control bus, data bus)). The one or more processors may be, for example, central processing units (CPU), application specific integrated circuit (ASIC), digital signal processor (DSP), field programmable gate arrays (FPGA), conventional microprocessors, multi-core processors, combinations thereof, and/or the like. The memory may be implemented as a conventional non-transitory memory, such as for example, random access memory (RAM), a solid state drive, a magnetic hard drive, a flash drive, an optical drive, combinations thereof, and/or the like. The memory may be located in the same physical location as the one or more processors, but such co-location is not be required. The communications interfaces may, among other things, operably connect the certification server to the internet. The input/output system handles the man-machine interface of the certification server 110. As illustrated, this man-machine interface is preferably delivered through a series of web pages that may be implemented in hypertext markup language. It should be understood, however, that manner in which the interface is implemented may change without departing from the present disclosure.

As illustrated in FIG. 1, database 120 contains certification data 121, certification specification data 122, test plan data 123, and known threats & vulnerabilities data 124. These types of data are merely separated for purposes of representation. All of these data could be stored in a single database or distributed across more than four databases, so long as the desired datasets are available for use by certification server 110, self-certification portal 130, public certification list 140, and public reporting portal 150. Each of the databases are illustrated as being in write-only, read-and-write, or read-only communication with one or more of the logical elements of the certification server 120. Each of these databases (121, 122, 123, and 124) can be a relational database or a non-relational database. Examples of such databases comprise, DB2®, Microsoft® Access, Microsoft® SQL Server, Oracle®, mySQL, PostgreSQL, MongoDB, Apache Cassandra, and the like. It should be understood that these examples have been provided for the purposes of illustration only and should not be construed as limiting the presently disclosed inventive concepts. The databases can be centralized or distributed across multiple systems and/or physical locations. As such, these databases are merely logical representations of data needed by the system 100. Accordingly, the data does not have to be in four different databases for this system to work; it could be maintained in single database, as well.

In particular, data entry and validation engine 111 of certification server 110 manages the man-machine interface of the self-certification portal 130, public certification list 140, and public reporting portal 150. As illustrated in this specification and associated drawings, self-certification portal 130, public certification list 140, and public reporting portal 150 are preferably graphical pages accessible via wide area networks, such as the internet. In particular, data entry and validation engine 111 renders web pages (see, e.g. FIGS. 4-10), accepts data entry via those web pages, validates aspects of the data input, dynamically generates self-certification entry forms based on the information input via the self-certification portal 130 based on data drawn from database 120.

Figure 2:
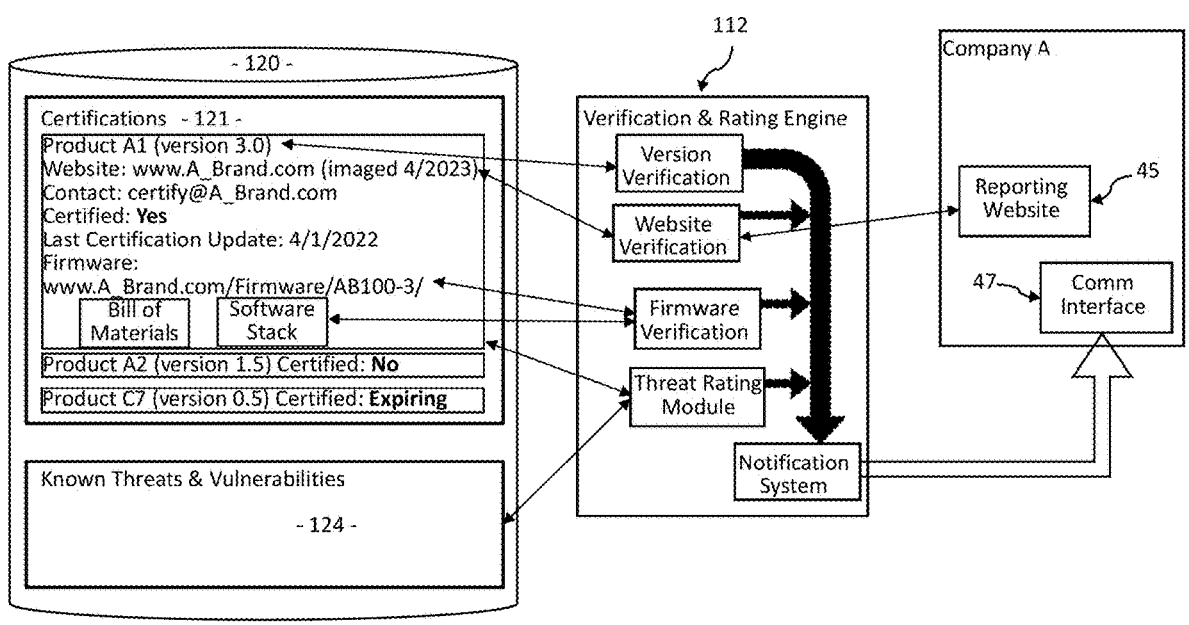
FIG. 2 is an illustration of a portion of the self-attestation security verification and reporting system of FIG. 1.

As illustrated in FIG. 2, the verification & rating engine 112 of certification server 110, verifies at least certain elements of the self-reported data provided via data entry and validation engine 111. Verification & rating engine 112 may receive certain data (e.g. a bill of materials, software stack) that were uploaded to the certification server 110 via the self-certification portal 130 and saved in database 120 (and more particularly certifications data 121). As illustrated in FIG. 1, verification & rating engine 112 may also obtain copies of current firmware and reporting websites associated with products seeking certification to independently verify that the uploaded information is current. In some embodiments, the verification & rating engine 112 may obtain the bill of materials and/or software stack independently in the first instance. Verification & rating engine 112 also receives at least one more type of data from database 120: known threats & vulnerabilities data 124, which may be sourced in the manner discussed below.

Thus, as illustrated in FIG. 2, verification & rating engine 112 uses the available data from database 120, current firmware 43, and reporting website 45 to (1) verify that (a) the current version matches the self-reported version, (b) the identified website complies with certification requirements (as discussed below), and (c) the firmware complies with certification requirements; (2) rate the threat of the product (based on the bill of materials 41, software stack 42, and known threats & vulnerabilities); and (3) notify the manufacturer/distributor of a product (e.g., Product A1 submitted by Company A) if the product failed certification and the bases for that failure determination. As illustrated in FIG. 1, the notification 200 is sent to a company (illustrated as an email with the understanding that the form and format of the message has no bearing on the scope of the present invention). As further illustrated, that notification 200 preferably includes a hyperlink 201 to facilitate reconnection to the specific data for the failed product to facilitate expedited correction of the problem that defeated certification. The focus of the present invention on quickly helping the manufacturer/distributor of a "failed" product to bring the product (and its ecosystem) into at least minimal compliance with the selected certification standard is significant. It is highly desirable to minimize the length of time a product is out-of-compliance with security standards to improve the overall security of the internet.

For example, the uploaded (and preferably independently verified) current bill of materials and/or software stack for a particular product may be analyzed by the verification & rating engine 112 against the known threats & vulnerabilities data 124. In one particular example, Company B (e.g. manufacturer and/or distributor) has a Product B1, (i.e., a USB mouse) that incorporates a USB stack which includes a driver that enables the mouse to work with a specific operating system, like Linux. This data would be set forth in the software stack of Product B1 self-reported to the certification system (subsequently verified automatically by the verification & rating engine 112 and then saved to a certification file in database 120) as comprising: USB Driver Version 2.12.00; Session Request Protocol; Host Negotiation Protocol; OS Abstraction Support for Linux Kernel 5.7. In this example, the specific USB driver (Version: 2.12.00) may be readily available on open source forums to be downloaded and used by multiple companies that produce USB products (e.g., audio speakers, cameras, fax machines, keyboards, mice, printers, scanners). Perhaps a threat listing organization has already identified that USB driver Version: 2.12.00 has a vulnerability—standing alone or only when used in association with the OS Abstraction Support for Linux Kernel 5.7—that enables a security threat (e.g., it facilitates hackers recording data input through the USB port making end user's input data vulnerable to collection). After identifying this threat/vulnerability, the verification & rating engine 112 may notify the company of the "failure" via the notification system, which sends a message (see FIG. 1, element 200) to the communication interface 47 of the company. The verification & rating engine 112 may also further evaluate the severity of the risk before or after notifying the company of the certification "failure."

In another aspect of data verification, illustrated in FIG. 1, verification & rating engine 112 may scrape the text set forth on one or more webpages associated with any URL provided via the self-certification portal 130 (see, e.g., FIG. 4) into a verification file (stored with certifications data 121 in database 120) that may be searched for key terms and indexed. In an illustrative example where certification relates to a security camera, the certification specification may require a support term of two years, the verification and rating engine 112 may search the verification file for a string matching at least the concept of "support term of 2 years" (e.g., "support period of 2 years", "support term of twenty four months" or "support" within three words of "two years" or "three years" or "four years" or "five years"). If such a match is found, the verification & rating engine 112 may notate in the certification data 121 that the two support term has been verified. If a match is not found in the verification file, as illustrated in FIG. 2, the verification & rating engine 112 may notify the company of the failure via communication interface 47, thus, allowing the worker to update the webpages and/or provide a response to the automated identification of the potential deficiency. The verification & rating engine 112 may also further evaluate the severity of the risk before or after notifying the company of the certification "failure."

With respect to evaluating the severity of the potential risk, the threat rating module (see FIG. 2) of the verification & rating engine 112 may rate particular risks associated with particular asset types and particular vulnerabilities. In particular, the risk of any particular threat may be determined by the verification & rating engine 112 with reference to both the source of each element in the software stack and the level confidence of a known vulnerability. The following tables provide one potential example of this approach:

TABLE 1

| Number | Asset Type | Confidence Level | Rating |
|---|---|---|---|
| S1 | User Supplied Library | HIGH | 15 |
| S2 | Inherited Library - Similar Product | MEDIUM | 10 |
| S3 | Inherited Library from similar operating system, chipsets, and protocols. | LOW | 5 |

TABLE 2

| Number | Type | Confidence Level | Rating |
|---|---|---|---|
| V1 | Vulnerability which directly relates to the libraries from the source list. | HIGH | 5 |
| V2 | Vulnerability which were reported close in time to each other from any vulnerability in V1. | MEDIUM | 10 |
| V3 | Vulnerabilities which were reported from previous versions, similar operating systems, etc. | LOW | 15 |

In turn, the risk may be calculated by multiplying numerical values associated with each of the HIGH, MEDIUM, and LOW levels of confidence. In one embodiment the rating engine 112 may use a numerical value assigned to each asset type (such the numeric rating assignments set forth in Table 1 above) whereby the larger the number the lower relative risks posed. In the foregoing example of Table 1, S1 presents less risk than asset types S2 and S3. As illustrated by Table 2, vulnerability type V3 is assigned a lower risk number because that vulnerability type results in less risk because it is derived from the source list and not previous versions or similar operating systems, which would be outside the control of the Company/manufacturer. In this example, the intention is that the larger the total number when adding related asset and threats the more secure the product. It would be understood of by those of ordinary skill in the art having the present specification and drawings before them how to create a mechanism where the smaller the number the more secure the product. Thus, utilizing the present invention, the certification process can include a rating process utilizing a threat rating module smartly configured to apply a threat rating, which represents the possibility of the vulnerability relating to additional products. Furthermore, the threat rating module includes a notification subsystem smartly configured to notify product manufactures of the related vulnerability and the vulnerability rating.

The known threats & vulnerabilities data 124 may be obtained from a variety of sources. First, certification server 110 includes threat & vulnerability collector engine 114. Among other things, this threat & vulnerability collector engine 114 searches available third party databases 75 for threat & vulnerability information. In this manner, the self-attestation security verification and reporting system of the present invention enables a rating system that breaks down the silo effect (i.e., where an individual product manufacturer or organization is aware of an actual or potential vulnerability or threat to an electrical component or software element) that information may apply to a broad range of products and would be helpful to other product manufacturers to keep the consumer safe and to produce safe products. As illustrated in FIG. 1, the threat & vulnerability collector engine 114 may also collect threat/vulnerability information from public reporting portal 150.

The certificate auto update engine 113 of certification server 110 determines how often a particular granted certification should be reevaluated. At a minimum, certificate auto update engine 113 will attempt to automatically update a product's certification after a predetermined period of time. In this sense, automatic update refers to automatically submitting the certification data 122 for a product to the verification & rating engine 112 for analysis. This predetermined period of time may be the same for all of the products that have been certified via the self-certification portal 130 (e.g., quarterly, semi-annually, annually). Alternatively, the predetermined period of time may be different depending upon the type of certification (i.e. type of product and/or its category). For instance, a security camera device requires an annual firmware update whereas an electronic air conditioner only requires updates ever 2 years. It is also possible for this predetermined period of time to be shortened if the threat & vulnerability engine 114 come across a serious new threat or vulnerability.

Figure 3:
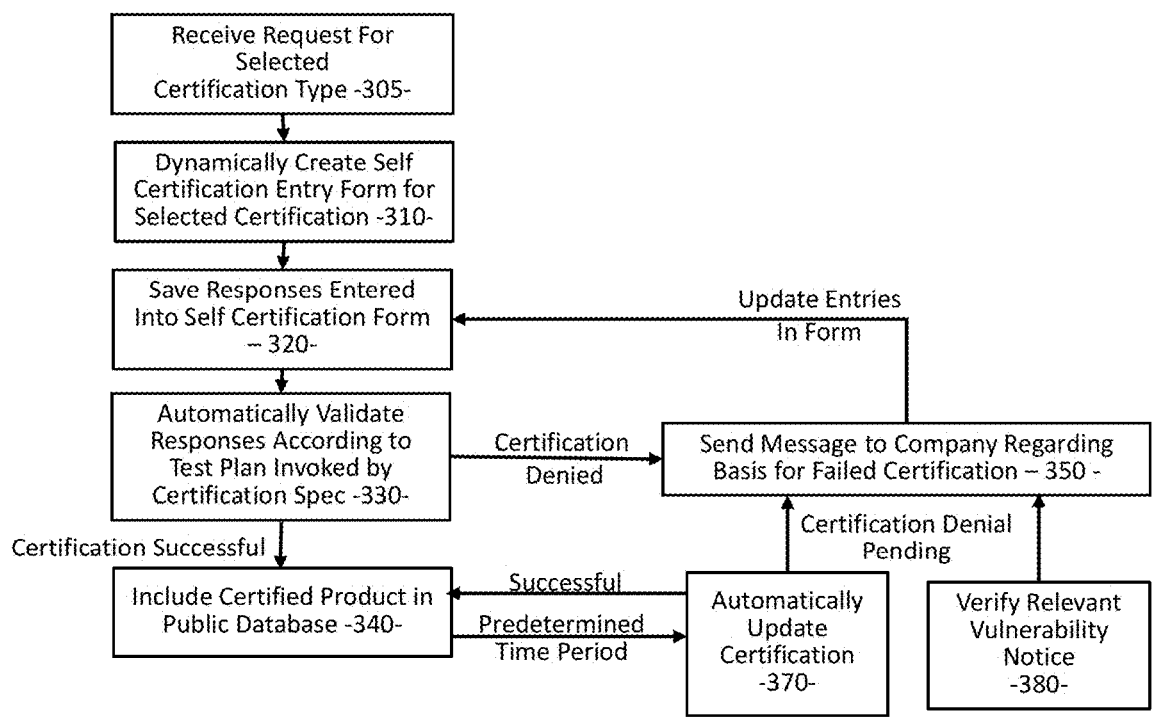
FIG. 3 is a flow diagram of a portion of the processes that are conducted by the self-attestation security verification and reporting system of FIG. 1.

As illustrated in association FIGS. 1-3, a worker at Company A would seek certification for Product A1 on behalf of Company A through self-certification portal 130 via communication interface 47. At some point, that worker (or perhaps another worker associated with Company A) would have created a password-protected account with certification server 110 for use in association with the worker's efforts on behalf of Company A, in a manner that is already well understood in the industry. That established account may have information regarding Company A, such as its legal name, physical mailing address, website URL, email address for official notices, and the identities (e.g., name, email address, phone number) of one or more workers authorized to transact business with the certification server 110 on behalf of Company A. Using an account, the worker may gain access to the self-certification portal 130 to input information regarding Product A1.

FIG. 3 is a flow diagram of a portion of the processes that are conducted by the self-attestation security verification and reporting system of FIG. 1. Initially, the certification server 110 receives a request for a selected certification type (305) based the particular data entered by the worker via self-certification portal 130. This is illustrated, for example, by the data entry screen of FIG. 4. As illustrated in this figure, the worker inputs the type of product certification will be sought for (e.g. device, mobile application, or component). As illustrated, this (and other input fields) may be provided with a pull-down menu to facilitate (and potentially constrain) selection of product type. Jumping over the next few entries in FIG. 4 to "category," the worker selects a category associated with the product from a constrained set of choices, which may include, for example: automotive; finance/payment software; home appliances; home & office equipment; IoT controllers; lighting & electrical; multimedia; security systems; sensors & controls; smart home controllers; social; telecom; VPN; wearables & health; and Wi-Fi & Networking. These categories are merely intended to be illustrative of potential categories that may be provide in association with the self-attestation security verification and report system 100. It is contemplated that additional or different categories may be used in association with the system with the understanding that the device type and category are often the primary, if not the sole, bases for selecting the particular certification specification type. As such, the categories should be selected to incorporate products that have similar security threats and vulnerabilities. Accordingly, by the selection of particular product type and particular category, the certification server 110 recognizes the selection of a particular certification type.

Figure 4:
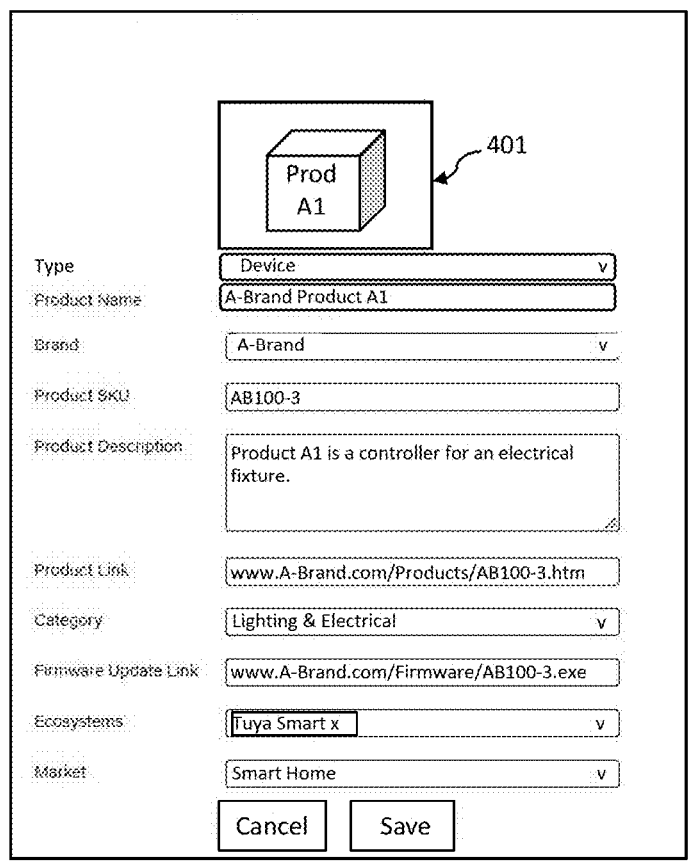
FIG. 4 is an illustration of one data entry screen of the graphical user interface of the self-certification portal 130 in accordance with an embodiment of the present invention.

FIG. 4 illustrates that additional information may be collected. For instance, the worker may input the product name (i.e. "A-Brand Product A1") as free-form alphanumeric text and the brand name (i.e. "A-Brand") as free-form alphanumeric text or by using the associated pull down menu. It is contemplated that the brands accessible to any user via this pull-down menu will be limited to those brands previously associated with their affiliated company. The worker may further input one or more product stock keeping units (SKUs) associated with Product A1 (i.e., AB100-3); a short product description; a URL where the product will be advertised (i.e., www.A-Brand.com/Products/AB100-3.htm); and allow the worker to upload a photo (401) of the product. As illustrated, the form may provide the opportunity to disclose associations between the product and one or more ecosystems (e.g., Android®; Works with Google Assistant®; Works with Alexa®; Network Lighting Controls; Android Enterprise Reco . . . ; PSA Certified; Midea®; Toshiba®; Tuya Smart®) and markets (e.g. smart home).

FIG. 4 further illustrates that the worker may also be asked to provide a URL for the location of a firmware update link associated with the product for which certification is being sought. Information regarding a firmware update link may be necessary to successfully meet all of the requirements of some certification specifications 122. As would be understood by those of ordinary skill in the art having the present specification and claims before them, the particular order of presentation of the elements in the entry form of FIG. 4 (and in the other illustrations of graphical user interface screens in this specification) are not likely impact operation of the present system. In other words, the forms and screens may appear different and yet accomplish the results sought by the present system and methods taught herein. Moreover, not all of the information requested in the form of FIG. 4 is necessary to appropriate operation of the system. For example, while desirable for use in the public certification list 140, the product description is not necessary for the certification server 110 to validate the other responses provided toward testing and certifying a product.

Returning to the flow diagram of FIG. 3, once the selected certification type is determined, the data entry and validation engine 111 dynamically creates the necessary self-certification entry form for the specific product (310) based on the certification type selected using the certification specifications 122 in database 120. A portion of one particular set of forms that may be dynamically created are illustrated by the data entry screens of FIGS. 5-8. As illustrated through these figures, the worker inputs information regarding the product by answering questions about the product and the ecosystem that the company has created around the product.

Figure 5:
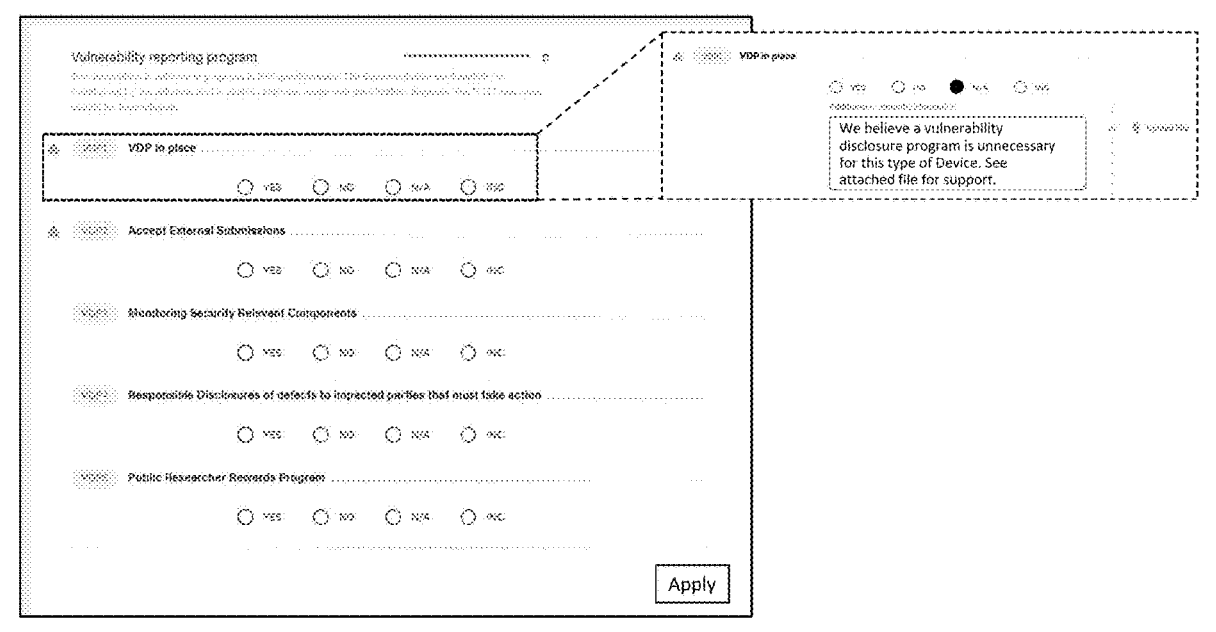

For instance, in the example illustrated by FIG. 5, the system asks questions about the vulnerability reporting program (sometimes referred to as vulnerability disclosure program ("VDP")) established by the company in association with the product. As illustrated, questions regarding the existence of a VDP, whether that program accepts external submissions regarding vulnerabilities, whether the company is monitoring security relevant components, whether there are responsible disclosures of defects to impacted parties, and whether the company has a public researcher rewards program are posed via radio buttons (YES, NO, N/A (not applicable) and INC (inconclusive). These question could alternatively be posed using a drop-down menus and other mechanism that will ensure that the worker's responses to the posed questions are limited to the predetermined set of answers (such as the four potential answers illustrated). It should also be noted that the user interface does allow the worker to provide a free-form alphanumeric explanation for the response. As illustrated in FIG. 5, the worker may alternatively or additionally upload one or more files in association with each question posed.

Figure 7:
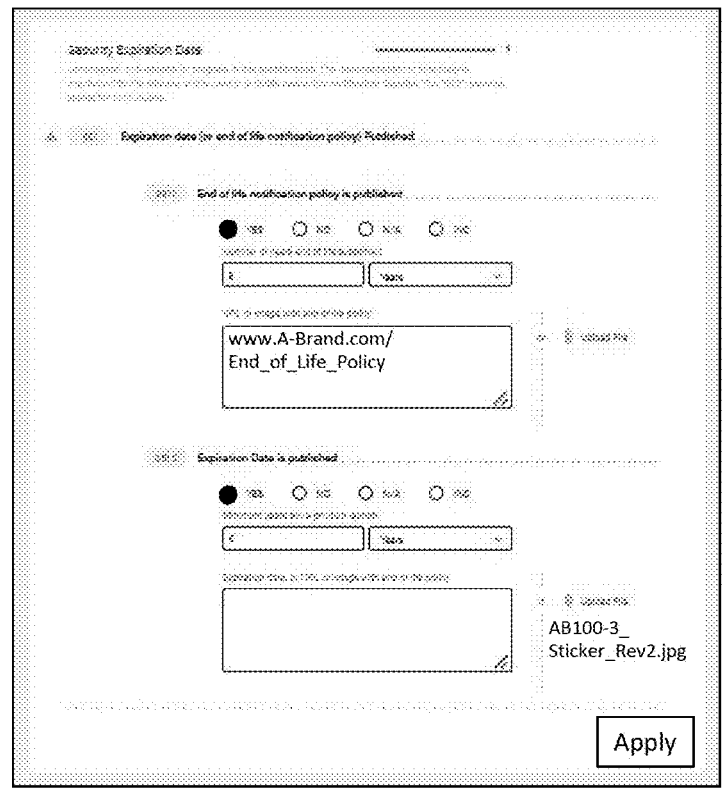
FIG. 7 is an illustration of another data entry screen of the graphical user interface of the self-certification portal 130 in accordance with an embodiment of the present invention.

As illustrated in FIG. 6, one a section of the certification questionnaire has been completed the system may display the responses in denser-format to allow easier visualization over less screen space. FIG. 7 illustrates questions associated with security expiration dates. As illustrated in the figure these inquiries may lend themselves to providing one or more particular URLs or an image file that support the conclusion that the company complies with one or more particular aspects of the certification standard.

Figure 8:
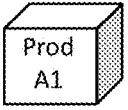
FIG. 8 is an illustration of another screen of the graphical user interface of the self-certification portal 130 in accordance with an embodiment of the present invention.

FIG. 8 illustrates the final summary page for the particular self-certification forms for the selected certification type illustrated in the figures. This summary illustrates that the responses entered into the self-certification have been saved (320) for evaluation under this particular certification type. The summary also illustrates that various portions (1 or 2) of eight programs are minimally required for this selected certification type: (1) vulnerability reporting program; (2) security expiration date; (3) automatically applied updates; (4) verified software; (5) proven cryptography; (6) secured interfaces; (7) security by default; and (8) no universal password. The particular requirement of each program are set forth in published copies of the respective standards profiles including, for example: mobile application, network lighting controller, residential camera, and smart speaker. FIG. 8 further illustrates at least a portion of the system automatically validating the responses according to the test plan 123 invoked by the selected certification specification 122. In particular, the graphical user interface of FIG. 8 already illustrates near the bottom of the page that the "product does not meet the minimum certification requirements for this profile" demonstrating a portion of the automatic validation.

Thus, returning to the flow diagram of FIG. 3, the system has automatically validated the responses according to the particular one of the test plans stored in portion 123 of database 120 that was invoked by the selected certification type. This validation may further comprise the various verifications conducted by verification & rating engine 112 (as illustrated in association with FIG. 2). As one of ordinary skill in the art having the present specifications and drawings before them would recognize, if the product selection (i.e., product type and category) were different than the aspects validated may vary.

As shown in FIG. 3, if the data obtained, for example, by user-entry (via the self-certification portal 130) and automatically by the verification & rating engine 112 cannot be validated according to the test plan invoked by the selected certification specification then certification would be denied and a message is sent to the company regarding the basis for failed certification by the notification system of the verification & rating engine 112. As illustrated by FIG. 1, this notification may comprise message 200, which may be received by the company via their communication interface 47. Message 200 may include a hyperlink to the failed certification data to facilitate updating thereof.

As illustrated in FIG. 3, the worker may update entries in the form in response to receiving a message regarding failed certification. This entry update may also comprise an update of the bill of materials 41, the software stack 42, current firmware 43 and/or text on the reporting website 45. As would be understood by those of ordinary skill in the art having the present specification and drawings before them, these updates to the BOM, stack and firmware should be accompanied by real-world changes to the actual product for the certification to have any real-word value to consumers and the public at large.

Once the certification file is updated (i.e., new response entered into the save certification form are saved (320), the verification & rating engine 112 of the certification server again automatically validates the responses according to the test plan invoked by the selected certification specification. The scope of the automatic validation is discussed above in conjunction with the explanation of the verification & rating engine 112.

If the certification is successful, the certified product is included in the public certification database. FIG. 9 is an illustration of one data entry screen of the graphical user interface of the public certification list 140 in accordance with an embodiment of the present invention. In particular, FIG. 9 illustrates that the public can search for particular types, categories, ecosystems, and/or companies associated with certified products. Aside from the search function, it would be possible to browse web page by web page, product by product in the manner that people have general familiarity with from browsing website on the world wide web. It is alternatively possible for potential purchasers, purchasers and users of certified products to look up the current information associated with a particular product in the public certification database by scanning a barcode (e.g., QR code), associated with the certified product (e.g., displayed on the product housing or associated packaging), identification via proximity communication (e.g., Bluetooth®, NFC, RFID, WiFi), or by selecting a hyperlink displayed in a user interface associated with the product (e.g., a configuration window). Public certification list 140 is intended to provide real-time information regarding certification and, most importantly, decertification of a previously certified product to avoid unnecessary risks/vulnerability.

Figure 10:
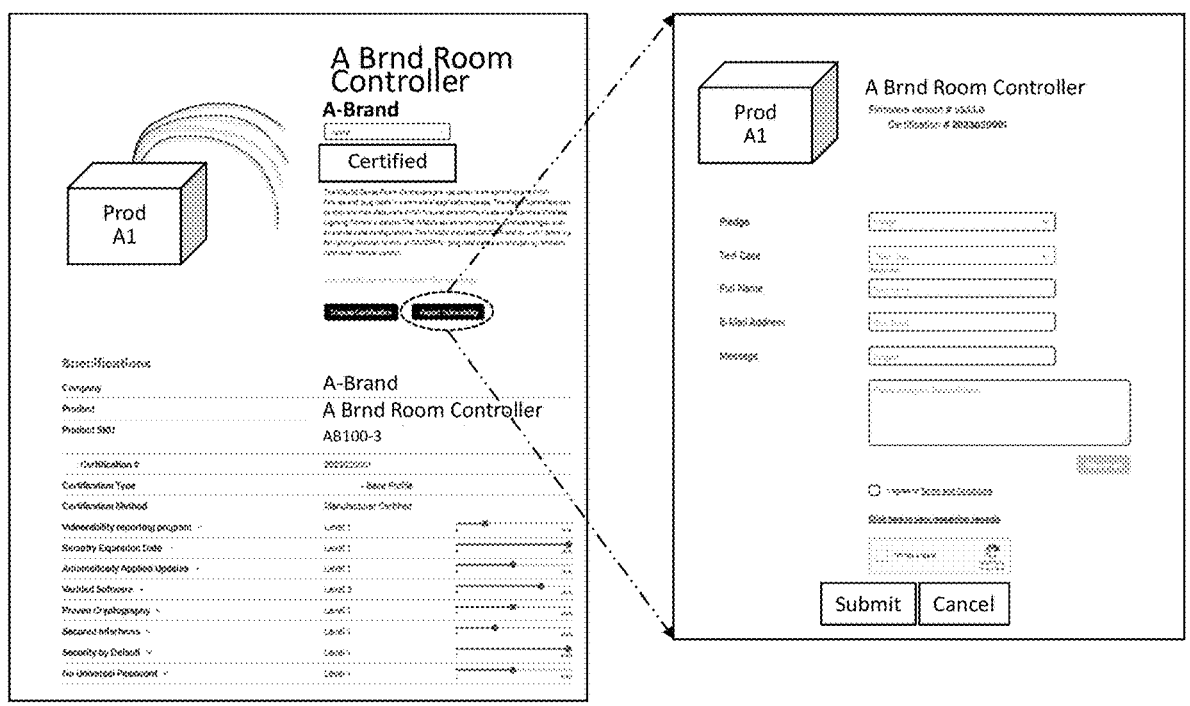
FIG. 10 is an illustration of one data entry screen of the graphical user interface of the public reporting portal 150 in accordance with an embodiment of the present invention.

As additionally illustrated, once a product is certified and listed in the public certification list 140, it may be subjected to public reporting of vulnerabilities and/or disputes over the propriety of the certification. FIG. 10 illustrates data entry screens of the public reporting portal 150 in accordance with an embodiment where a member of the public may view the basis for current certification of a particular product and select the "Dispute Certification" and/or "Report Vulnerability" buttons. Both buttons result in the launch of a data entry form that provides for the reporting of an alleged vulnerability or the basis for the purported dispute with the certification. As illustrated in FIG. 3, such a report may be verified (380) by the certification server 110. This verification may be facilitated by the verification & rating engine 112. A notice that the particular certification is subject to pending a denial is sent to the company. This notice may include information regarding the basis for the pending denial of the certification such that the company may refute the potentially relevant vulnerability reported by updating entries in their certification data. If the company does not respond to the message regarding the pending denial of the certification within a predetermined time, then the certification will be removed.

As likewise illustrated in FIG. 3, the system may determine after a predetermined period of time that the certification must be updated. This predetermined period of time may be the same for all of the products that have been certified via the self-certification portal 130 (e.g., quarterly, semi-annually, annually). Alternatively, the predetermined period of time may be different depending upon the type of certification (i.e. type of product and/or its category). For instance, a security camera device requires an annual firmware update whereas an electronic air conditioner only requires updates ever 2 years. It is also possible for this predetermined period of time to be shortened if the threat & vulnerability engine 114 come across a serious new threat or vulnerability. Furthermore, the verification & rating engine 112 may find that a particular product has been superseded by a newer version that has not been certified. Engine 112 may find this out by scrapping the known webpages of the company and comparing the version being marketed/supported via the company's website versus the version for which the certification was obtained. Regardless of the basis, if the system determines that an update of the certification is needed, it will send a message to the company regarding the pending denial of the certification.

While particular embodiments of the present invention have been shown and described, it should be noted that changes and modifications may be made without departing from the presently disclosed inventive concepts in its broader aspects and, therefore, the aim in the appended claims is to cover all such changes and modifications as fall within the true spirit and scope of this invention. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A method self-attestation security verification and reporting for a product by a company, the method comprising:
   (a) receiving, via a processor, a request for selected certification type;
   (b) dynamically creating, via the processor, a self-certification entry form based on elements of the selected certification type;
   (c) saving responses, via the processor, entered into the self-certification entry form;
   (d) automatically validating the responses for the product, via the processor, according to a test plan invoked by the selected certification type;
   (e) upon successful validation of the product, including the product in a list of certified products accessible to the public;
   (f) automatically reviewing, via the processor, the successful validation of the product after a predetermined time period;
   (g) if the product fails the automatic validation, sending a first message to the company regarding the basis for failed certification; and
   (h) if the product fails the automatic update of the successful validation, sending a second message to the company regarding the basis for pending denial of certification,
   wherein the first and second messages contain a hyperlink to the responses for the product.

2. The method according to claim 1 wherein a version number was included among the saved responses entered into the self-certification entry form for the product and the product has a bill of materials, automatically validating comprises verifying that current version associated with the bill of materials matches the version number by scrapping one or more websites identified among the responses entered into the self-certification entry form and comparing the scraped data with the saved responses.

3. The method according to claim 2 wherein automatically validating further comprises verifying that one or more website identified among the responses entered into the self-certification entry form complies with one or more certification requirements.

4. The method according to claim 3 wherein the product has associated firmware, automatically validating further comprises verifying that firmware associated with the product complies with certification requirements by obtaining a copy of the firmware.

5. The method according to claim 4 wherein the product has a software stack, automatically validating further comprises rating the security threat associated with the product based on one or more of the bill of materials, the software stack, and the firmware.

6. The method according to claim 5 wherein rating the security threat utilizes a database of known threats and vulnerabilities.

7. The method according to claim 6 further comprises collecting known threats and vulnerabilities from one or more sources, including: (1) reports from the company, (2) third party threat and vulnerability information, and (3) reports from the public.

8. The method according to claim 7 wherein rating the security threat further comprises assessing a level of confidence in a known threat or vulnerability.

9. The method according to claim 1 wherein the predetermined time period is based on the product type and category.

10. The method according to claim 1 wherein automatically validating further comprises verifying that one or more website identified among the responses entered into the self-certification entry form complies with one or more certification requirements.

11. The method according to claim 1 wherein the product has associated firmware, automatically validating further comprises verifying that firmware associated with the product complies with certification requirements by obtaining a copy of the firmware.

12. The method according to claim 1 wherein the product has a software stack, automatically validating further comprises rating the security threat associated with the product based on one or more of the bill of materials, the software stack, and the firmware.

13. The method according to claim 12 further comprises collecting known threats and vulnerabilities from one or more sources, including: (1) reports from the company, (2) third party threat and vulnerability information, and (3) reports from the public.

14. The method according to claim 13 wherein rating the security threat further comprises assessing a level of confidence in a known threat or vulnerability.

* * * * *